United States Patent [19]

Davidson

[11] Patent Number: 5,841,467
[45] Date of Patent: Nov. 24, 1998

[54] GROUND ISOLATION CIRCUIT FOR ISOLATING A TRANSMISSION LINE FROM GROUND INTERFERENCE

[75] Inventor: Craig A. Davidson, Webster, Tex.

[73] Assignee: The United States of America as represented by the Administrator of the National Aeronautics and Space Administration, Washington, D.C.

[21] Appl. No.: 595,312

[22] Filed: Feb. 1, 1996

[51] Int. Cl.⁶ .............................. H04N 7/10; H04B 1/26
[52] U.S. Cl. .............................. 348/6; 455/6.1; 455/326; 375/258
[58] Field of Search .......................... 348/6, 7; 375/258, 375/284, 285, 296; 455/278.1, 14, 20, 3.1, 5.1, 63, 6.2, 326; 332/159, 167, 172, 135; 329/323, 332, 333, 335; H04N 7/10; H04B 1/38, 1/26

[56] References Cited

U.S. PATENT DOCUMENTS

| | | |
|---|---|---|
| 3,652,941 | 3/1972 | Neuf . |
| 4,430,758 | 2/1984 | Snyder . |
| 4,536,618 | 8/1985 | Serrano ................................. 379/372 |
| 4,669,038 | 5/1987 | Whitford . |
| 4,812,849 | 3/1989 | Otto . |
| 5,361,074 | 11/1994 | Hansen .................................. 375/258 |
| 5,574,749 | 11/1996 | Nelson et al. ......................... 375/258 |
| 5,606,734 | 2/1997 | Bahu ................................... 455/278.1 |

Primary Examiner—Andrew I. Faile
Assistant Examiner—Ronald D. House
Attorney, Agent, or Firm—James M. Cate

[57] ABSTRACT

An isolation circuit is disclosed for isolating ground interference from a wideband transmission signal. The ground isolation circuit of the present invention is constructed using a pair of matched mixer circuits, each of which receives a carrier signal from the same oscillator circuit. The first mixer circuit also receives the baseband signal input after appropriate conditioning, and modulates the baseband signal onto the carrier signal. In the preferred embodiment, the carrier signal has a predetermined frequency which is at least two times the frequency of the baseband signal. The modulated signal (which preferably comprises an rf signal) is transmitted via an rf transmission line to the second mixer, which demodulates the rf signal to recover the baseband signal. Each port of the mixer circuits connects to an isolation transformer to insure isolation from ground interference.

5 Claims, 3 Drawing Sheets

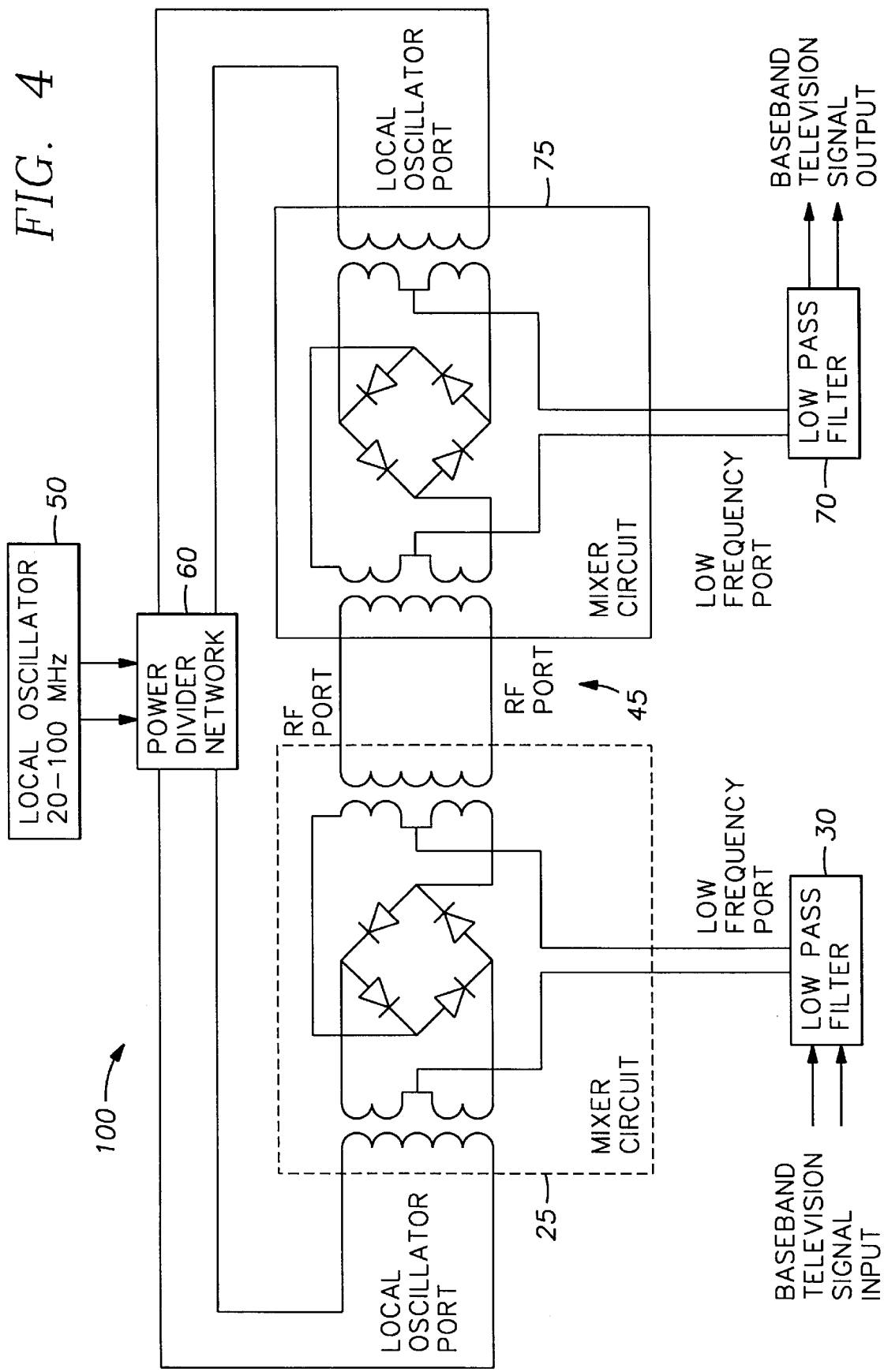

GROUND ISOLATION CIRCUIT FOR ISOLATING A TRANSMISSION LINE FROM GROUND INTERFERENCE

ORIGIN OF THE INVENTION

The invention described herein was made in the performance of work under a NASA contract, and is subject to the provisions of Public Law 96-517 (35 USC 202 et seq.) in which the Contractor has elected not to retain title.

BACKGROUND OF THE INVENTION

The present invention relates generally to a system for isolating ground interference from a wideband transmission line. More particularly, the present invention relates to a ground isolation circuit which can be constructed economically and in a relatively compact package. Still more particularly, the present invention relates to a ground isolation circuit for isolating a wideband transmission signal (such as a video signal) from ground by modulating the base signal on a carrier signal to permit the transmission signal to be isolated using less expensive, and more compact, components.

As shown in the prior art diagram of FIG. 1, two or more components may be connected together via a wideband transmission line to facilitate the exchange of data in a system or network. An example of a wideband transmission line is a co-axial cable that is capable of transmitting signals within a desired frequency band. For a video signal, for example, the frequency band may span 20 Hz–4 MHz. When transmitting signals between two or more components on a transmission line, each of the components typically are connected to ground in an attempt to eliminate electromagnetic interference (commonly referred to as EMI). In the simple system shown in FIG. 1, two system components are identified as component #1 and component #2. As generally shown in FIG. 1, a ground line may connect to the chassis of each component in the system to provide suitable grounding. Typically, co-axial cable is used as a transmission line, and the shield of the co-axial cable connects electrically to the chassis of system components. In normal operation, data signals (including video, audio, and other signals) are transmitted over the transmission line between system components.

Although the use of the ground line eliminates much of the interference which would otherwise be present in the system, the use of the ground line does not completely eliminate the problem with interference. One problem is that the ground cable acts as an antenna, inducing current to flow through the ground cable. Further, the ground cable provides a ground loop between system components. If the chassis of the various system components are at different voltage potentials, current will flow through the ground cable. This current in the ground line mixes with the data signal being transmitted (or received) over the transmission line, thus distorting the data signal and making it difficult to recover. If, for example, a video signal is being transmitted over the transmission line, the receiving component could receive interference with the video signal, causing distortion in the data obtained.

In an attempt to alleviate this problem, the system shown in FIG. 2 was developed. The system shown in FIG. 2 is similar to the system of FIG. 1 except that isolation circuitry is interposed between the system components and the transmission line. The isolation circuitry functions to isolate the transmission line from the system component, thus eliminating the ground interference that plagues the configuration of FIG. 1.

While the isolation circuitry of FIG. 2 successfully eliminates ground interference from the data signal, the isolation circuitry must be configured so that it efficiently couples the data signal between the transmission line and the system component. As a result, the isolation circuitry must be designed with a view to the signal it will be coupling.

If the data signal comprises a video signal, for example, the isolation circuitry must be capable of efficiently transmitting signals with a frequency range of 20 Hz to 4 MHz—a relatively large frequency band. To efficiently couple signals in this frequency band, specialized coupling components are required. Moreover, generally the lower the frequency is of the signal to be passed, the larger the transformer must be. As a result of these requirements, the ground isolation circuitry used in video and television systems typically comprises either video transformers or optical isolators, both of which are expensive and relatively large in size.

It would be extremely desirable to develop isolation circuitry for video systems and other wideband communication systems which can be more economically constructed and which can be housed in smaller packages. Such isolation circuitry would appreciably decrease both the size and cost of existing systems. Despite the readily apparent advantages of such a design, to date no one has developed a suitable design for isolation circuitry to accomplish the foregoing objects.

SUMMARY OF THE INVENTION

The present invention solves the deficiencies of the prior art isolation circuits by implementing a pair of balanced mixer circuits which are respectively used to modulate and demodulate a baseband data signal with a high frequency carrier signal. The advantage to this approach is that the modulated signal can be isolated using RF transformers, which by comparison with video transformers, are much less expensive and much smaller in size.

Thus, the present invention contemplates coupling the baseband signal to the low frequency port of a mixer circuit. A local oscillator couples to a local oscillator port of the mixer circuit to supply a high frequency carrier signal. The mixer circuit modulates the baseband signal onto the carrier frequency, and provides the modulated signal to an RF transmission line at the RF port. A second matched mixer circuit couples to the RF transmission line to receive the modulated signal at its RF port. The same local oscillator couples to the local oscillator RF port on the second mixer circuit. The oscillator signal, which by definition is the carrier signal, functions to cancel the carrier signal in the second mixer circuit, leaving the baseband signal. The baseband signal is provided at the low frequency port of the matched mixer circuit, and is coupled to the data transmission line for relaying to other system components.

The isolation circuitry preferably functions bi-directionally, so that a baseband signal appearing on the transmission line is modulated by the second mixer circuit and demodulated by the first mixer circuit.

BRIEF DESCRIPTION OF THE DRAWINGS

For a more detailed description of the preferred embodiment of the invention, reference will now be made to the accompanying drawings, wherein:

FIG. 4 is a more detailed diagram illustrating the isolation circuit of FIG. 3.

DESCRIPTION OF THE PREFERRED EMBODIMENT

Figure 3:
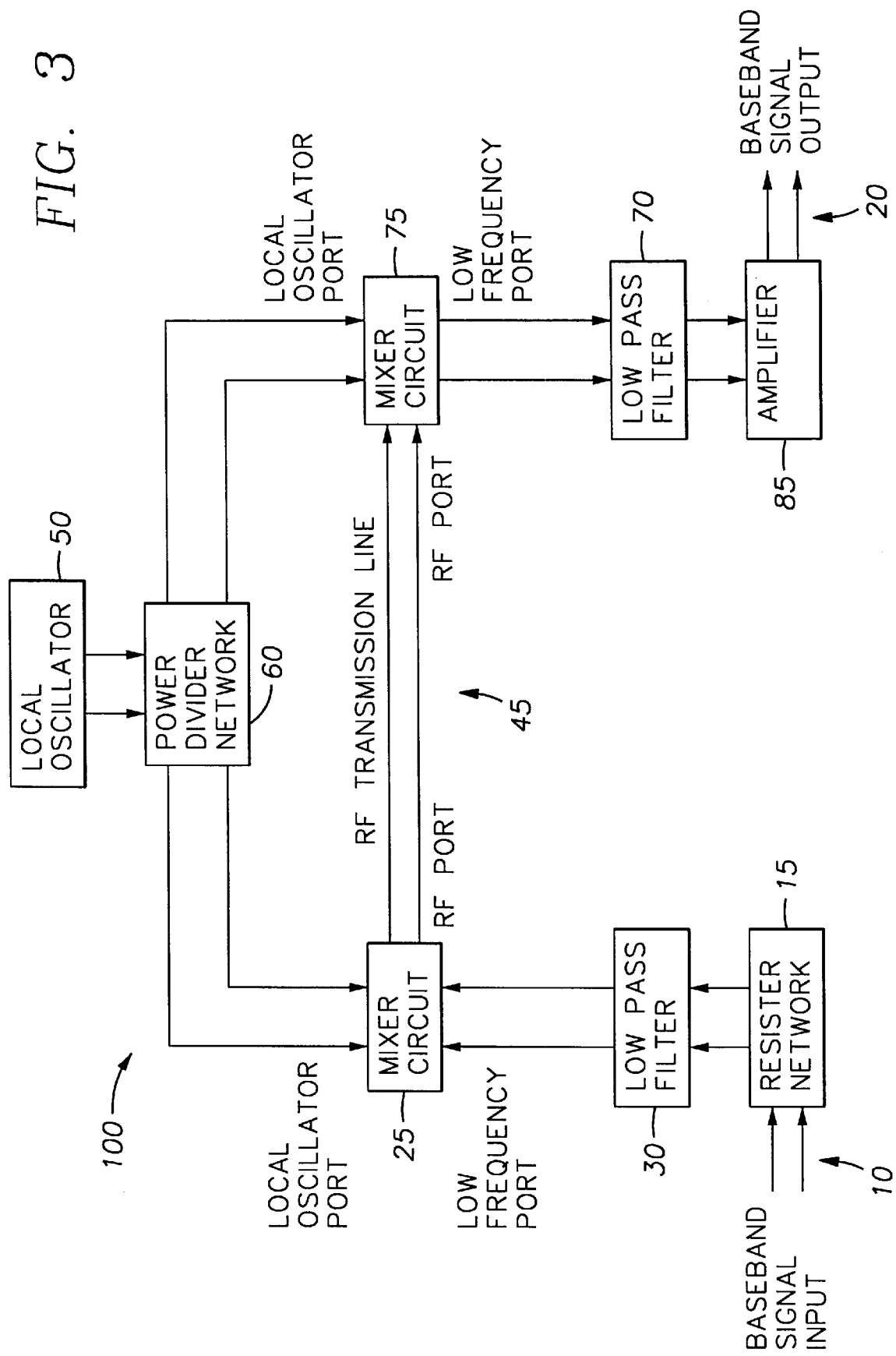
FIG. 3 is a functional block diagram depicting the isolation circuit constructed in accordance with the preferred embodiment.

Referring now to FIG. 3, an isolation circuit 100 constructed in accordance with the preferred embodiment will now be described. In the preferred embodiment, an isolation circuit 100 is provided between each system component (the output terminals of one such component is shown at 10) and the transmission line 20. As one skilled in the art will understand, however, isolation circuitry 100 may be used at individual components, as desired.

Figure 1:
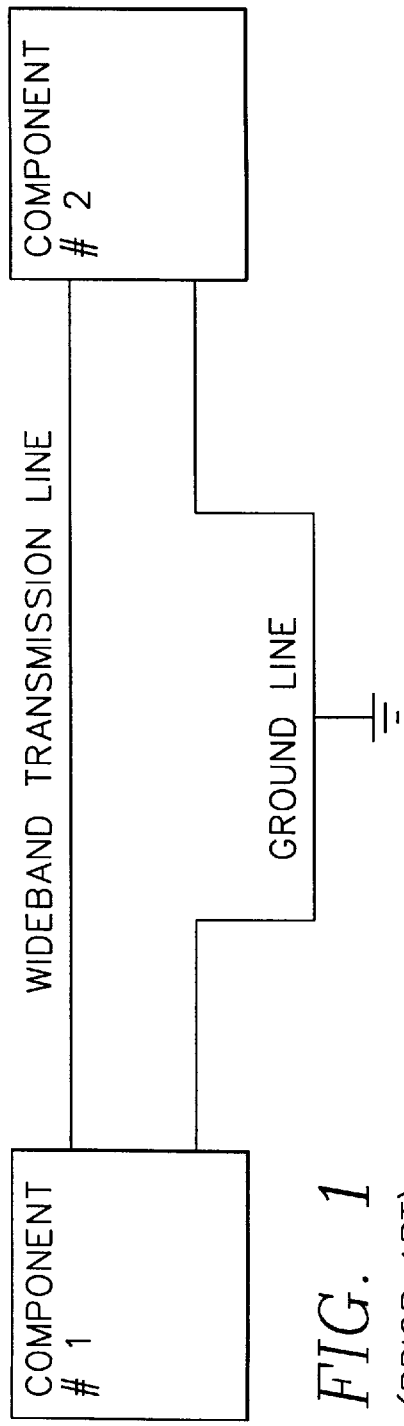
FIG. 1 is a block diagram depicting a prior art system for transmitting wideband signals between two components.
Figure 2:
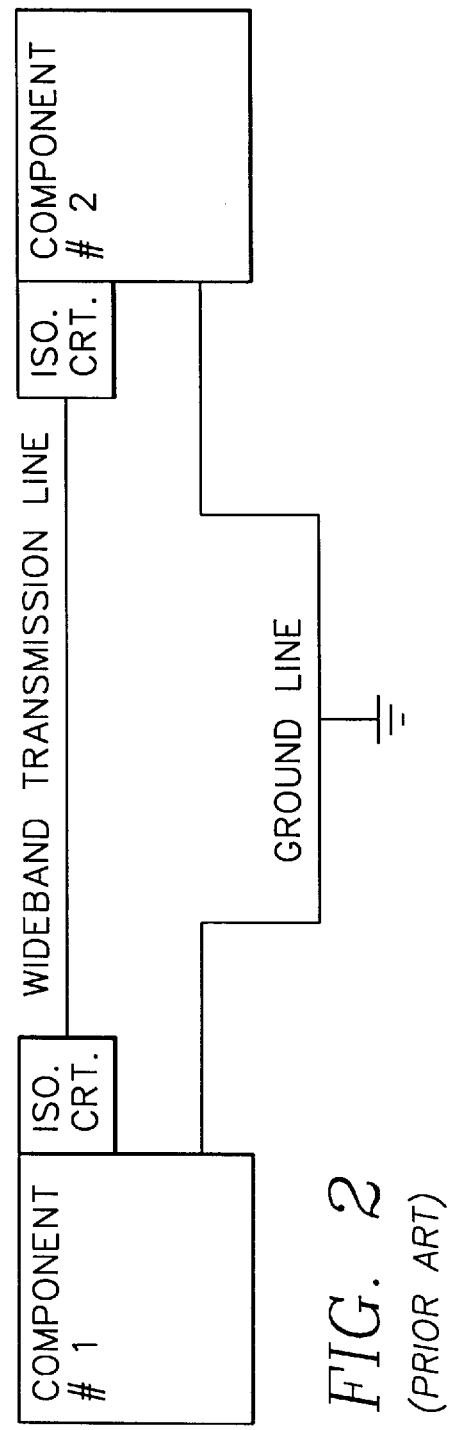
FIG. 2 is a block diagram depicting a prior art system as in FIG. 1, in which the wideband transmission line is isolated from ground to remove ground interference.

Referring still to FIG. 3, the isolation circuitry 100 preferably includes a first double balanced mixer circuit 25, a second double balanced mixer circuit 75, and a local oscillator 50 providing an oscillator signal to both mixer circuits 25, 75. As shown in FIG. 3, the output terminals 10 of a system component provide a baseband input signal to the isolation circuitry 100. The isolation circuitry 100 then isolates the baseboard signal to remove ground interference. Alternatively, the baseboard signal may be provided from the transmission line shown in FIG. 2.

In an exemplary embodiment, a resistor network 15 may be included as part of the isolation circuitry 100 to scale the input signal to a lower amplitude. Such scaling may be desirable to maintain the input signal within the range of linear operation of the mixer circuits 25, 75. Thus, if the present invention is implemented in a NTSC (National Television Systems Committee) system, which requires a standard signal level of 1.0 Volt peak-to peak, and the mixer circuits 25, 75 only operate linearly to 0.5 volts peak-to-peak, a resistor network 15 and amplifier 85 may be used to provide necessary signal reduction and amplification to permit linear operation of the mixer circuits. If the amplitude of the baseband signal is within the linear operating range of the mixer circuits 25, 75, then resistor network 15 and amplifier 85 could be eliminated.

The baseband signal (after scaling, if appropriate) preferably is provided to a low pass filter 30 to eliminate high frequency interference which may be contained in the baseband signal. Any conventional low pass filter may be used, and the particular threshold frequency may be selected based upon the frequency of the baseband signal. Thus, if a video signal is involved, with a frequency range of 20 Hz–4 MHz, a low pass filter with a threshold of 4 MHz may be used to filter out high frequency noise before modulation. The output terminals of the low pass filter 30 are provided to a low frequency port of the first mixer circuit 25.

Referring now to FIGS. 3 and 4, in addition to a low frequency port, the mixer circuits 25, 75 also include a local oscillator port and a RF port. The local oscillator port of mixer circuit 25 receives an oscillator signal from the local oscillator 50. In the preferred embodiment, the local oscillator 50 has a frequency that is preselected to be at least twice the frequency of the highest baseband frequency component. Thus, if the baseband signal is a video signal with a range of 20 Hz–4 MHz, the local oscillator will have a frequency of at least 8 MHz. More preferably, the local oscillator has a frequency that is ten times (10×) the highest possible baseband frequency. In the video implementation of FIG. 4, the local oscillator is shown with a frequency range of 20 MHz–100 MHz. As shown in FIG. 3, the output terminals of the local oscillator couple to mixer circuits 25, 75 via a power divider network 60 to insure the integrity of the clock signal. The power divider network 60 insures that the local oscillator signal is driven with sufficient power to both mixer circuits 25, 75, without any drift or phase shift of the oscillator signal.

Referring now to FIGS. 3 and 4, the oscillator signal from the local oscillator 50 functions as a carrier signal, on which the baseband signal is modulated. The modulated signal then is output to the RF transmission line 45 by the mixer circuit 25 on the RF port.

As shown in FIG. 4, all three ports of the double balanced mixers 25, 75 are transformer coupled, thus providing the required ground potential isolation, and also providing isolation of the oscillator 50 from the video transmission signal. In the preferred embodiment, the double balanced mixer circuits 25, 75 comprise a Mini Circuit SRA-1 to provide double sideband suppressed carrier amplitude modulation of the baseband signal on the carrier signal. If signals are provided at the low frequency port and on the local oscillator port, modulation of the low frequency signal on the local oscillator signal occurs. Conversely, if an RF signal and an oscillator signal which reflects the carrier signal are received, a low frequency signal is provided as a demodulated output.

Referring still to FIGS. 3 and 4, the second double balanced mixer circuit 75 couples to the RF transmission line 45 at the RF port. The local oscillator signal is provided as an input to the local oscillator RF port of the mixer circuit 75. By using the same oscillator signal that is used for the modulation process, phase synchronous demodulation can be achieved in a relatively inexpensive manner. The demodulated baseband signal preferably is fed to a low pass filter 70, which removes high frequency noise and any remnants of the high frequency carrier signal. The output of the low pass filter 70 may be amplified through a suitable amplifier circuit 85, if desired. The baseband output then is driven on the transmission line.

In the preferred embodiment, the isolation circuit 100 provides bi-directional coupling of the baseband signal both from the system component to the transmission line 45, and from the transmission line 45 to the system component. This is due to the symmetrical operation of the double balanced mixer circuits 25, 75.

While a preferred embodiment of the invention has been shown and described, modifications thereof can be made by one skilled in the art without departing from the spirit of the invention.

I claim:

1. An isolation circuit for coupling a component to a transmission line, comprising:

a first mixer circuit receiving a baseband data signal at a low frequency port and providing a modulated signal at a high frequency port;

a second mixer circuit receiving said modulated signal at a high frequency port and providing a demodulated baseband signal at a low frequency port; and a local oscillator coupled to both said first mixer circuit and to said second mixer circuit to provide a carrier signal to said first mixer circuit for modulation and to provide a signal to said second mixer for demodulation, wherein each port of said first and second mixer circuits is transformer coupled, and wherein the baseband signal comprises a video signal with a lower and upper frequency range.

2. A circuit as in claim 1, wherein the local oscillator operates at a frequency that is at least twice the frequency of the upper frequency range of the video signal.

3. A circuit as in claim 1, wherein the local oscillator operates at a frequency that is approximately ten times the frequency of the upper frequency range of the video signal.

4. An isolation circuit for coupling a component to a transmission line, comprising:
- a first mixer circuit receiving a baseband data signal at a low frequency port and providing a modulated signal at a high frequency port;
- a second mixer circuit receiving said modulated signal at a high frequency port and providing a demodulated baseband signal at a low frequency port; and
- a local oscillator coupled to both said first mixer circuit and to said second mixer circuit to provide a carrier signal to said first mixer circuit for modulation and to provide a signal to said second mixer for demodulation, wherein each port of said first and second mixer circuits is transformer coupled and wherein the baseband signal comprises a wide band signal with a lower and upper frequency range, and wherein said local oscillator operates at a frequency that is at least twice the frequency of the upper frequency range of the baseband signal.

5. A circuit as in claim 4, wherein the local oscillator operates at a frequency that is approximately ten times the highest frequency range of the baseband signal.

* * * * *